United States Patent [19]

Schoettle et al.

[11] Patent Number: 5,558,275
[45] Date of Patent: Sep. 24, 1996

[54] PROTECTIVE COVERING FOR ARTICLES, IN PARTICULAR OF RECTANGULAR PARALLELEPIPED FORM

[75] Inventors: Klaus Schoettle, Strasbourg, France; Gerald-Wolfgang Borck, Ludwigshafen; Heinrich Wollensack, Kehl, both of Germany

[73] Assignee: BASF Magnetics GmbH, Mannheim, Germany

[21] Appl. No.: 143,021

[22] Filed: Oct. 29, 1993

[30] Foreign Application Priority Data

Oct. 31, 1992 [DE] Germany .................... 9214815 U

[51] Int. Cl.⁶ ...................................... B65D 43/22
[52] U.S. Cl. .......................... 229/125.37; 206/387.1; 229/120.011; 229/160.2
[58] Field of Search ............................ 229/87.05, 242, 229/160.2, 125.37, 123.2, 103, 129.011; 206/497, 387.1, 807

[56] References Cited

U.S. PATENT DOCUMENTS

| | | | |
|---|---|---|---|
| 3,239,128 | 3/1966 | Rumberger | 229/87.05 X |
| 4,077,516 | 3/1978 | Duerr | 206/497 |
| 4,290,526 | 9/1981 | Haiss | 229/87.05 X |
| 4,519,538 | 5/1985 | Omichi | 229/123.2 X |
| 4,630,735 | 12/1986 | Jebans | 229/242 |
| 4,648,507 | 3/1987 | Komiyama et al. | 206/387.1 X |
| 4,676,430 | 6/1987 | Wischusen, III et al. | 229/242 X |
| 4,771,938 | 9/1988 | Hambleton | 229/123.1 |
| 4,946,723 | 8/1990 | Paules et al. | 229/123.2 X |
| 5,011,014 | 4/1991 | Borck et al. | 229/87.05 X |
| 5,156,270 | 10/1992 | Kachel et al. | 206/497 X |
| 5,177,540 | 1/1993 | Honda et al. | 229/123.1 X |
| 5,217,307 | 6/1993 | McClintock | 229/123.2 X |
| 5,293,994 | 3/1994 | Antik | 229/242 X |
| 5,423,423 | 6/1995 | Sato et al. | 206/387.1 |

FOREIGN PATENT DOCUMENTS 8801045  9/1989  Germany .

*Primary Examiner*—Allan N. Shoap
*Assistant Examiner*—Christopher J. McDonald
*Attorney, Agent, or Firm*—Keil & Weinkauf

[57] ABSTRACT

An environmentally appropriate protective covering for articles, in particular rectangular parallelepipedal bodies, comprises a container receiving the article or rectangular parallelepipedal body, if appropriate is of a rectangular parallelepipedal form and is closed by means of an at least three-part, partly separable closure strip. For opening, the central part is separated from the side parts, which remain on the container. The presence or absence of the central part consequently represents an indication of originality. The closure strip can also be used advantageously in the case of a protective covering unit, comprising a plurality of stacked containers, for connecting and forming a pack. The invention can be used advantageously in any application where a single closure strip can be used to economize on outer packaging materials.

7 Claims, 4 Drawing Sheets

PROTECTIVE COVERING FOR ARTICLES, IN PARTICULAR OF RECTANGULAR PARALLELEPIPED FORM

The invention relates to a protective covering for articles, comprising a container having base and lid walls and side walls, in particular a container of rectangular parallelepiped form, and closure strips for such a protective covering, and a protective covering unit.

Articles of this type may be, for example, cassettes in rectangular parallelepipedal containers, such as for example CC boxes (snap packs) for compact cassettes and cases for video cassettes.

Magnetic tape cassettes are usually sold in packed containers, from which the cassettes are removed for use. For compact cassettes, for example, these containers are usually two-part boxes produced from transparent plastic which comprise lid and base parts hinged to each other and, in the closed state, offer reliable protection of the cassettes against dust deposits, scratching or other improper handling. In the case of VHS video cassettes, the container comprises a case which is open on one longitudinal side and is usually produced from cardboard or plastic. These containers also serve for the protected archiving of the cassettes. In order to guarantee the purchaser of such cassettes the originality of said cassettes, until now the new cassettes have been wrapped or packed completely in a sealed plastic film by the producer. After purchasing, these films are removed and thrown away by the purchaser, since they are torn and can no longer serve any other purpose in the protection or operation of the cassettes. This results in plastic waste which, in keeping with the law on the avoidance of waste, should be avoided or has to be recycled, which means reprocessed.

DE-U-8805045 discloses a packaging method for two or more cassettes in CC boxes, the individual CC boxes being packed individually in heat-sealed transparent film. The multipack comprises at least one piece of adhesive tape, by means of which two mutually opposite side faces of the at least two CC boxes are connected to each other to form a transportable stack. For separating the individual CC boxes, tear lines, in particular perforations, are provided in each case along the parting lines between two boxes.

The comments made above apply as far as the torn transparent film of the individual packs is concerned, and the part played by the adhesive tape material, which has to be removed and disposed of, is not insignificant even in the case of two packed CC boxes.

It is an object of the present invention to reduce the waste of such protective coverings or protective covering units or packs, it being intended to retain a means of checking the originality of the protective coverings or protective covering packs.

We have found that this object is achieved by a protective covering of the type described at the beginning if the container is closed on a side at which it can be opened or is opened for removal of the article by means of at least three-part bonding or adhesive strip which can be separated by separating lines. The central part of the bonding or adhesive strip is detachable from the container and has at least one dimension which corresponds at most to the container height.

Consequently, to release an opening for removal of the articles, the central part can be torn off from the two other parts, referred to hereinafter as side strip parts, along the parting lines and be detached from the container. Consequently, the central part remains the only waste, which has a size of only a few square centimeters, preferably of recyclable material (for example paper or film), since the side strip parts remain on the container walls on account of the adhesive. Consequently, it is ensured that originality, or the loss of originality, of a pack according to the invention can be recognized immediately.

In the case of a protective covering where the container is a hinged-lid container, in particular for rectangular parallelepipedal bodies and in particular for cassettes, the bonding or adhesive strip should be arranged in the transverse direction over the dividing line of the hinged lid, and the central part of the bonding or adhesive strip should have one dimension of approximately the height of the container.

Consequently, one of the parting or separating lines, as a limitation of the central part, lies in the vicinity of the dividing line of the hinged lid, so that after removal of the central part the hinged lid can be gripped by hand and can be swivelled for removal of the article, in particular the rectangular parallelepipedal body or the cassette.

In a development of the protective covering design outlined above, in the case of containers having a depressed grip on the long narrow side of the container, at the edge of which the dividing line of the hinged lid is also arranged, the width of the central part may be equal to or greater than the height of the depressed grip.

After separating the central part, it not being at all necessary here to detach it from the container, the depressed grip itself is consequently freed form parts of the bonding or adhesive strip.

There is a possible further development of a protective covering with a container as a hollow body, in particular a hollow rectangular parallelepiped, with one open side for rectangular parallelepipedal bodies, in particular for video cassettes. In this further development the open side is at least partially adhesively covered by means of the bonding or adhesive strip and the central part of the bonding or adhesive strip corresponds in one of its dimensions, in particular its width, to the height of the open side of the hollow rectangular parallelepiped.

Consequently, a closure of the open container side, and therefore a protection of the exposed side of the rectangular parallelepipedal body or the video cassette, is achieved by simple means.

According to the invention, the separating lines are designed as perforation or tear lines, it being advantageously possible to provide incisions at their beginning and end to facilitate gripping and tearing.

The closure strip for a container, in particular for a rectangular parallelepipedal container, is designed according to the invention as an at least three-part bonding or adhesive strip, the central part of the strip having at least one dimension corresponding at most to the height of the container to be packed.

The three-part bonding or adhesive strip may be designed both asymmetrically and symmetrically with respect to its central part.

A multiplicity of closure strips may be produced in series in the form of a chain or band, the individual closure strips being cut off in the region between the parting lines.

This invention thus concerns a protective covering unit for articles, comprising a plurality of uniform separate containers stacked one on top of the other, each thereof having a base, lid and side walls and at least one open side or a parting join for opening the container, the containers being connected to one another on at least one non-open side, or a side on which there is a parting line, by means of at least one closure strip. The defining distinction of this invention is the feature that the at least one closure strip comprises a plurality of individual parts of a bonding or adhesive strip which are separably joined together by means of parting lines which are not arranged over the parting lines of the stacked containers, so that the central part arranged above the parting lines is detachable from the adjacent containers and this central part has at least one dimension which is less than twice the container height.

Consequently, apart from the advantageous saving of a great part of the packaging material of such a pack, a permanent check on the originality is obtained, determined by whether the central part is still present or has been separated and detached. In an advantageous embodiment two closure strips could be used around the vertical edges of two or more horizontally stacked containers.

The bonding or adhesive strip may expediently be provided on one side with a heat-sealing or contact adhesive either over its full area or distributed over its entire area.

In order that the detachability of the central part is ensured, if a contact adhesive is used there may consequently be a depressed grip, to the size of which the central part is adapted, or if a heat-sealing adhesive is used the central part is hollowed out during heat sealing.

It is also possible, however, that the bonding or adhesive strip is provided with a contact or heat-sealing adhesive only on the side parts and not on the central parts, so that the detachability is in any case ensured, since no adhering to the cassette takes place.

Exemplary embodiments of the invention are described below and represented in the drawing in which.

Figure 1:
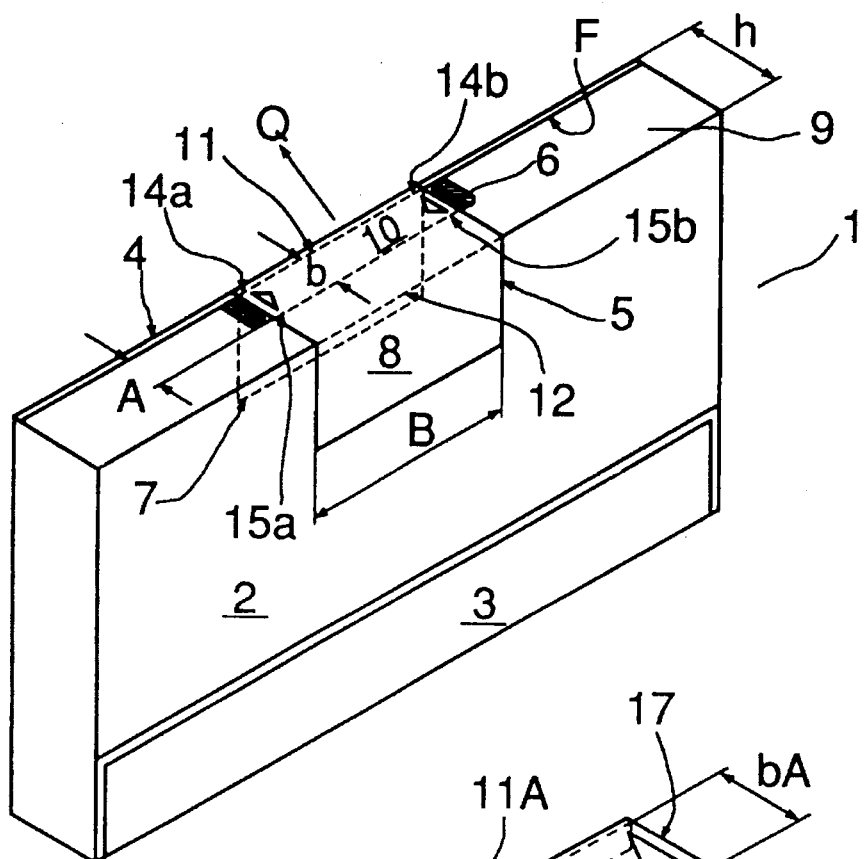
FIG. 1 shows a CC box for a compact cassette with a first closure strip design.

FIG. 1 shows the side view of a CC box or snap pack 1 as a container for a compact cassette with a view of the base part wall 2 and the pocket wall 3 of the lid part 4. Approximately in the center of the container narrow side 9 there is an elongate depressed grip 6, which extends in its width A approximately over half the height 2h of the same narrow side 9.

Fastened transversely over the container narrow side 9 is a closure strip 5, which reaches from the base part wall 2 to the lid part 4 and is designed as a bonding or adhesive strip of any suitable type. The closure strip 5 covers the dividing join or line F between lid part 4 and narrow side 9. The closure strip 5 comprises a central part 10, a first side part 8 on the base part wall and a second side part 7 on the wall of the lid part 4, which wall is not visible in this representation. The central part 10 is separably connected by means of the parting lines 11 and 12, for example perforations or tear lines or some other type, to the side parts 7 and 8. The triangular symbols represent gripping zones of the closure strip 5 and of the further closure strips. If one of these gripping zones is grasped with fingers and pulled up, the central part 10 is torn off to release the depressed grip 6 and the lid part 4 is swivelled in the opening direction. The article which is in the CC box container 1 does not necessarily have to be rectangular-parallelepipedal, but may be, as is the case with a cassette which is not represented here.

The length and width B of the closure strip 5 and of the closure strips still to be described are chosen such that, with as little expenditure on material as possible, the desired closure function and recognizability of the existent or non-existent originality of the pack are achieved, with at the same time minimal waste material after opening of the pack. In the example in FIG. 1, the width b of the central part 10 is governed by the width A of the depressed grip 6, to the extent that the width b should satisfy $b \leq A$, in order that, after tearing off the central part 10, as far as possible no protruding edges of the parting lines 10 and 11 in the depressed grip 6 can hinder the opening operation. The side parts 7 and 8 remain bonded or adhesively fixed on the wall of the lid part 4 and on the base part wall 2, respectively, so that the lack of originality can be recognized immediately.

If there is no depressed grip 6, the width b of the central part may correspond at most to the height h of the narrow side 9, $b \leq h$.

In the case of $b \sim h \sim A$, the side part 8 has a greater length than the side part 7. In the design represented, the side part 7 and 8 are consequently designed non-symmetrically with respect to the central part 10. In the case of $b \sim h$, there is approximate symmetry with respect to the central part 10.

The example of the pack in FIG. 1 was implemented in practice. In the case of a CC box container 1 with depressed grip 6 having a depressed grip area of $A=7$ mm width and $L=32$ mm length and a width of the closure strip of about B-30mm, there was waste amounting to the size of the area of the central part 10 of 2.1 cm$^2$.

Figure 2:
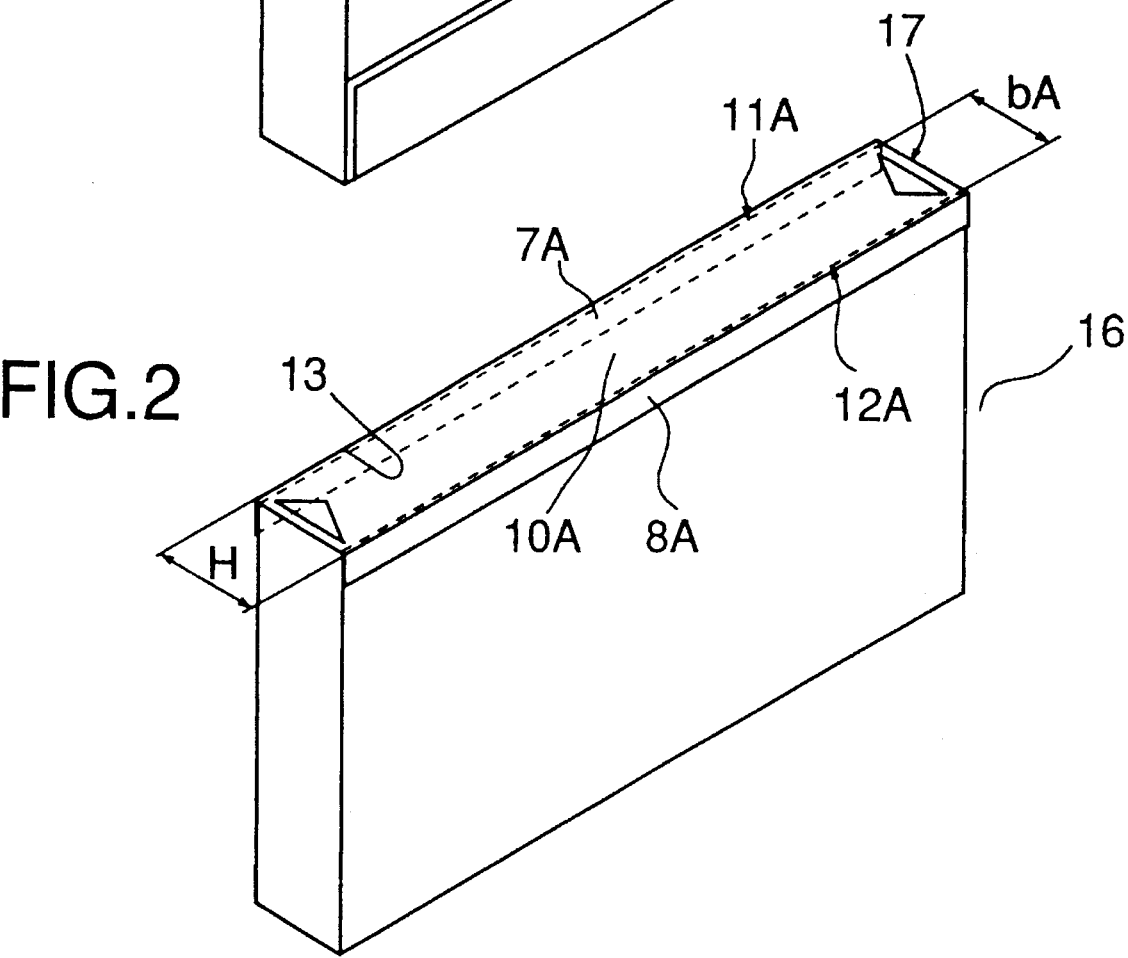
FIG. 2 shows an alternative closure strip design.

FIG. 2 shows a hollow rectangular parallelepipedal case 16 in side view, the opening of which, open side 13, is covered completely and in a dustproof manner by a closure strip 17 according to the invention. The central part 10A has approximately a width $bA \geq H$, corresponding to the thickness or height H of the case 16. The widths of the side part 7A and 8A have been chosen to be narrow, for the purpose of saving material. The separating lines are 11A and 12A. The central part 10A is approximately 48 cm$^2$ in size, which is the only waste. In the case of this design, it is advantageous that all other additional covering or wrapping cartons, etc., can be dispensed with.

In principle it is also the case with the CC box 1 of FIG. 1 that, if there is no depressed grip 6, a long closure band corresponding to the closure strip 17 could be used. The corresponding central part waste area would then be about 17 cm$^2$.

Figure 3:
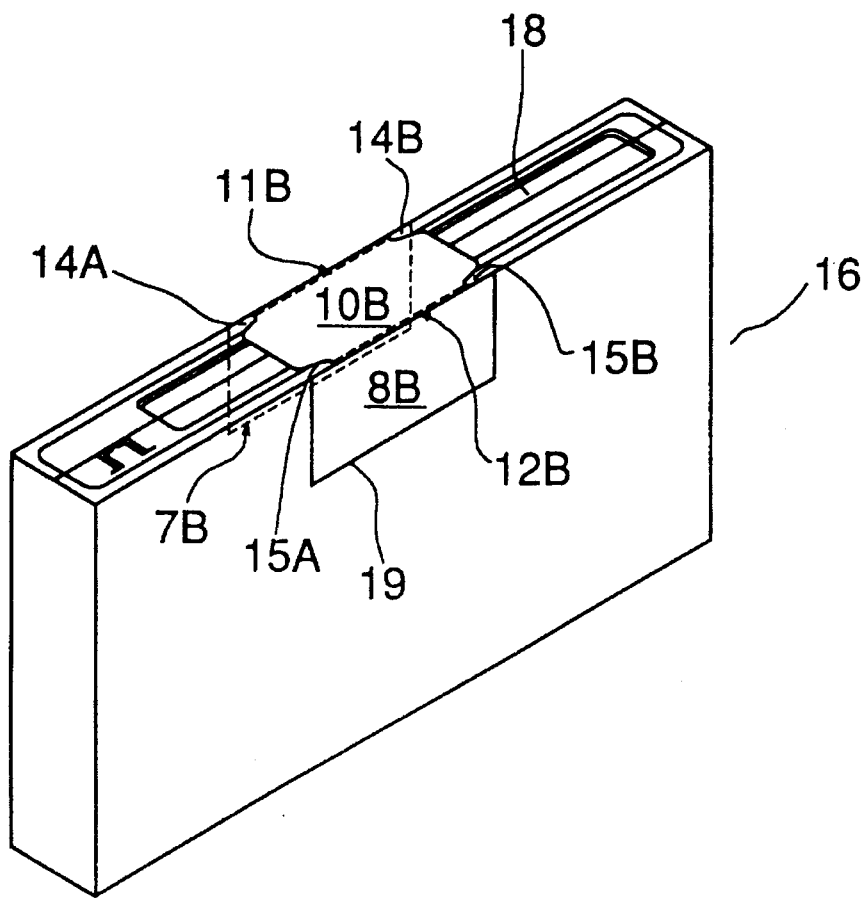
FIG. 3 shows a video cassette case with a similar closure strip design as in FIG. 1.

FIG. 3 shows a case 16 with a video cassette 18 in it and with a closure strip 19, which has a central part 10B, side parts 8B and 7B, and separating lines 11B and 12B. Incisions 14A, B and 15A, B at the beginning and end, respectively, of the central part 10B facilitate grasping of the central part 10B. The incisions 14 and 15 are provided in each case at the beginning and at the end of the separating lines 11B and 12B, but they may also be provided at the separating lines 11 and 12 of FIG. 1, as indicated by arrows and at the separating lines 11A and 12A of FIG. 2.

Figure 4:
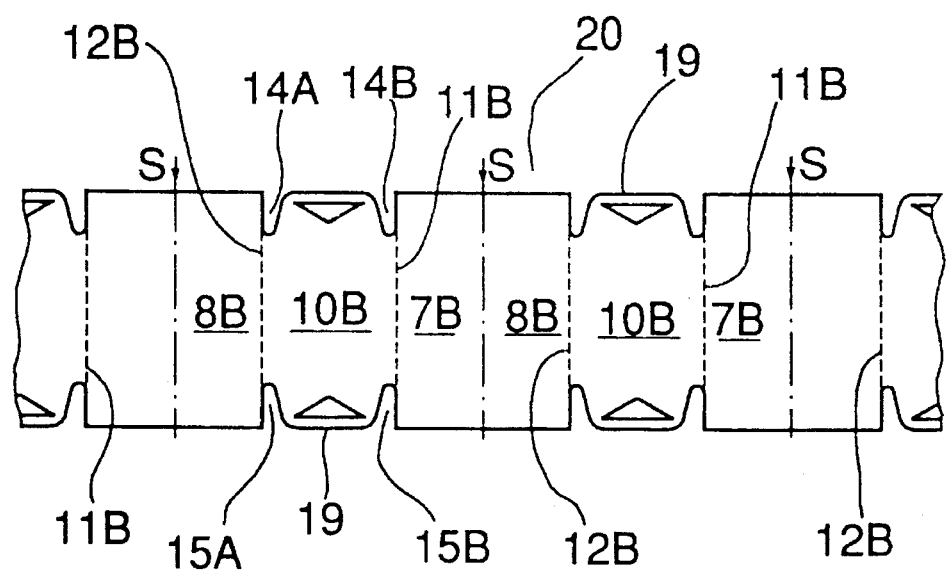
FIG. 4 shows a closure strip band before cutting into individual strips.

FIG. 4 shows as an example the closure strip 19 from FIG. 3 produced as a continuous band 20. Parting lines 11B and 12B are prepunched, as are the gripping incisions 14A, B and 15A, B. Before the closure strips 19 are applied to the packs, the band 20 is cut up at the cutting points S, that is in each case between the separating lines 11B and 12B, so that the individual closure strips 19 are produced. Each design of closure strips of the type which come into consideration here, for example 5, 17 and 23, can similarly be produced and processed in band form.

Figure 5:
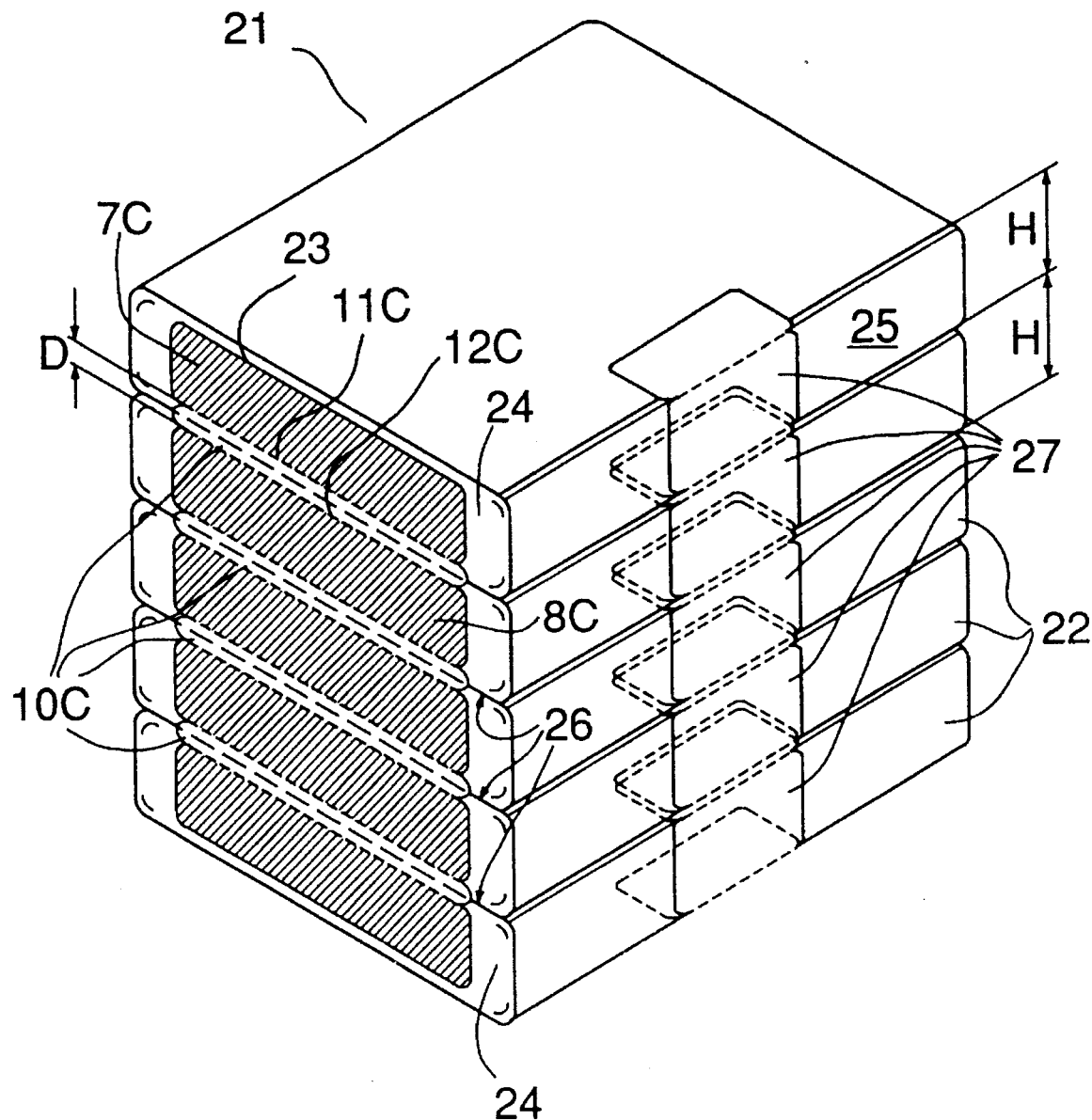
FIG. 5 shows a container pack unit with a closure strip.

In FIG. 5 a stack 21, comprising five individual rectangular parallelepipedal containers 22, is connected to form a protective covering unit by means of a bonding or adhesive strip 23, which in this case is formed by four central parts 10C and side parts 7C and 8C with parting lines 11C, 12C. The width D of the central parts is to be less than twice the container height H: D<2H, in order that even after removing each of the central parts 10C the respective side parts remain on the container narrow sides 24 as a visible indication of the loss of originality of the protective covering unit. This is the case if the detachable central part 10C is not arranged in such a way that the parting lines 11C, 12C come to lie congruently over the parting lines 26, but the central part 10C in any case covers the parting join 26.

Figure 6:
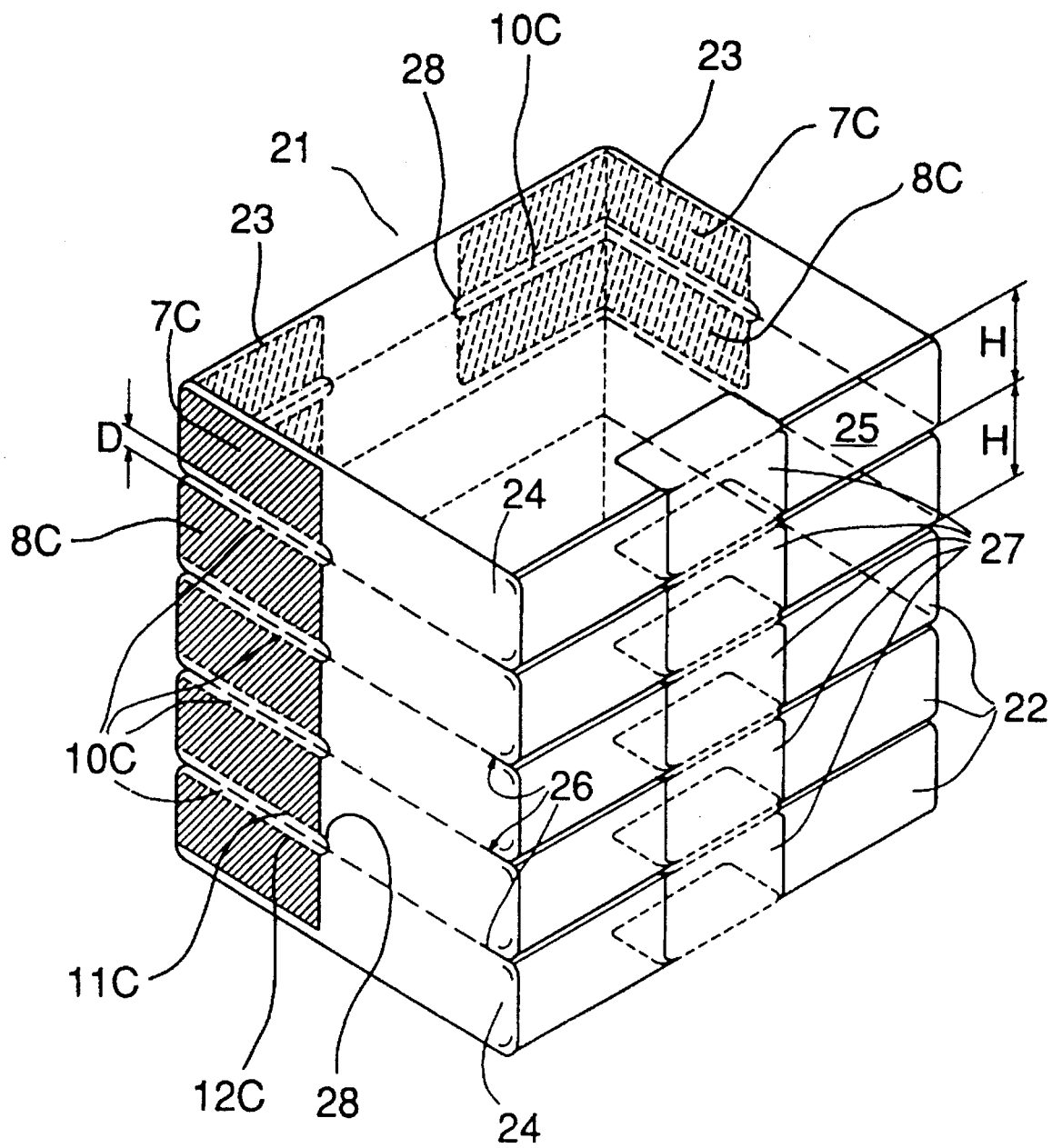
FIG. 6 shows a container pack unit with another version of closure strips.

In FIG. 6 such an embodiment is shown in which around the remote vertical edges of the pack unit bonding or adhesive strips 23 or 23' respectively are arranged which serve only as closure or connecting means of at least two containers 22. At least one of the ends of the central part 10C can be provided with tearing-nose 28. The length of the strips 23 corresponds to the form and weight of the containers 22 including the articles packed therein, so that the connecting function is obtained.

It goes without saying that on the remote side of the stack 21 a different type of stack connection, for example a single adhesive strip without any parting lines, may also be provided there.

Correspondingly to the closure strips 19, closure strips 20 are provided over the open sides or parting lines of the long narrow sides 25 of the individual containers 22.

The closure strips of the present invention are bonding or adhesive strips which are provided on one side with a heat-sealable adhesive or a contact adhesive either over their full area, parts 10, 7 and 8, or over part of their area, for example only parts 7 and 8.

The contact or heat-sealing adhesive is to be of such a composition that the bonding or adhesive connections produced by it between the strip material to be adhesively fixed and the container material are inseparable without applying force. An example of a suitable contact adhesive is the polyurethane adhesive PEX 759 of Messrs Raflatac, Finland, and examples of suitable heat-sealing adhesives are hot-curing phenolic, melamine or urea resins or epoxy resins or adhesive dispersions or coatings.

An environmentally appropriate protective covering for articles, in particular rectangular parallelepipedal bodies, comprises a container receiving the article or rectangular parallelepipedal body, which is closed by means of an at least three-part, separable closure strip. For opening, the central part is separated form the side parts, which remain on the container. The presence or absence of the central part consequently represents an indication of originality. The invention can be used advantageously in any application where one closure strip can be used to economize on further and other packaging materials.

As examples, only three-part closure strips were described above. It goes without saying that designs comprising more parts can similarly be used with advantage.

We claim:

1. A container of substantially cuboid form comprising base and lid parts hingedly connected to one another, said base part having a narrow side, a dividing line located between and separating said narrow side and said lid part, where the lid part can be opened for removal or insertion of a magnetic tape cassette, said narrow side being traversed by a three-part closure strip, said closure strip having separating lines between said three parts, said three-part closure strip consisting of two side parts and a central part therebetween and is of a bonding or adhesive material wherein said separating lines are arranged adjacent and parallel to said dividing line and the width of said three-part closure strip is a fraction of the length of the narrow side of said base part, and wherein the container has on the narrow side a depressed grip for opening the container, and wherein the width of the central part is at least equal to the width of the depressed grip.

2. The container of claim 1, wherein the separating lines are perforation or tear lines.

3. The container of claim 2, wherein incisions are provided at the beginning and end of the perforation and tear lines to facilitate tearing.

4. The container of claim 1, wherein the central part of the closure strip has a dimension corresponding at most to the height of the narrow side of the container.

5. The container of claim 1, wherein the central part of the closure strip has a dimension corresponding to about half the height of the narrow side of the container.

6. The container of claim 1, wherein said container is in combination with a plurality of identical containers which are the same as said container, said plurality of containers being horizontally stacked one on top of the other and connected to one another on at least one non-open side, or on a side on which there is a separating line for opening the container, by at least one closure strip, said at least one closure strip comprising a plurality of individual parts of a bonding or adhesive material which are separably joined together by means of separating lines which are not arranged over the separating lines of the horizontally stacked container, so that a central part of the at least one closure strip arranged above the separating lines is detachable from containers which are adjacent to each other, and this central part has at least one dimension which is less than twice the container height.

7. A package according to claim 6, wherein two bonding or adhesive strips are provided around each of the vertical edges farthest away from an open side of at least two of the containers horizontally stacked one on top of the other.

* * * * *